US012090614B2

(12) United States Patent
Jin et al.

(10) Patent No.: US 12,090,614 B2
(45) Date of Patent: Sep. 17, 2024

(54) STUCK STAPLE PROCESSING MECHANISM OF ELECTRIC STAPLER AND ELECTRIC STAPLER

(71) Applicant: DELI GROUP CO. LTD, Zhejiang (CN)

(72) Inventors: Yanda Jin, Zhejiang (CN); Zhimin Li, Zhejiang (CN); Jiehui Yu, Zhejiang (CN)

(73) Assignee: DELI GROUP CO. LTD, Zhejiang (CN)

(*) Notice: Subject to any disclaimer, the term of this patent is extended or adjusted under 35 U.S.C. 154(b) by 0 days.

(21) Appl. No.: 17/800,546

(22) PCT Filed: Jun. 2, 2021

(86) PCT No.: PCT/CN2021/097921

§ 371 (c)(1),
(2) Date: Aug. 18, 2022

(87) PCT Pub. No.: WO2022/041910

PCT Pub. Date: Mar. 3, 2022

(65) Prior Publication Data

US 2023/0330824 A1 Oct. 19, 2023

(30) Foreign Application Priority Data

Aug. 24, 2020 (CN) ........................ 202010858297.0

(51) Int. Cl.
*B25C 5/16* (2006.01)
*B25C 5/15* (2006.01)

(52) U.S. Cl.
CPC ............. *B25C 5/1675* (2013.01); *B25C 5/15* (2013.01)

(58) Field of Classification Search
CPC .......... B25C 5/1675; B25C 5/15; B25C 5/16; B25C 7/00
See application file for complete search history.

(56) References Cited

U.S. PATENT DOCUMENTS 2,801,414 A * 8/1957 Mueller ............... B25C 5/1696 227/127
5,007,572 A * 4/1991 Chung-Cheng ....... B25C 5/0228 227/7

(Continued)

FOREIGN PATENT DOCUMENTS

CN 2815700 Y 9/2006
CN 101391540 A 3/2009

(Continued)

OTHER PUBLICATIONS

International Search Report for corresponding application PCT/CN2021/097921 filed Jun. 2, 2021; Mail date Jul. 29, 2021.

*Primary Examiner* — Thomas M Wittenschlaeger
*Assistant Examiner* — Katie L Gerth
(74) *Attorney, Agent, or Firm* — Samson G. Yu

(57) ABSTRACT

The disclosure discloses a stuck staple processing mechanism of an electric stapler and the electric stapler. The stuck staple processing mechanism of the electric stapler includes a driving mechanism, a transmission mechanism, a pop-up staple channel assembly, a controller and a pop-up mechanism. The transmission mechanism is connected with a pop-up switch of the pop-up staple channel assembly through the pop-up mechanism. When the controller controls the driving mechanism to rotate along a staple placing direction, the pop-up mechanism does not make the staple channel assembly act. When the controller controls the driving mechanism to rotate in an opposite direction of staple placing, the transmission mechanism makes the pop-up switch act through the pop-up mechanism to pop up a (Continued)

staple channel of the staple channel assembly, so as to facilitate a removal of a stuck staple.

14 Claims, 13 Drawing Sheets

(56) References Cited

U.S. PATENT DOCUMENTS

| | | | | | |
|---|---|---|---|---|---|
| 5,413,266 | A * | 5/1995 | Jairam | B25C 5/0228 | 227/129 |
| 6,135,337 | A * | 10/2000 | Harris | B25C 5/0228 | 227/7 |
| 7,455,206 | B2 * | 11/2008 | Huang | B25C 5/161 | 227/139 |
| 7,690,545 | B2 * | 4/2010 | Co | B25C 5/0242 | 227/135 |
| 7,984,837 | B2 * | 7/2011 | Palmquist | B25C 5/0228 | 227/154 |
| 9,522,463 | B2 * | 12/2016 | Marks | B25C 5/00 | |
| 2006/0151566 | A1 * | 7/2006 | Ebihara | B25C 5/0235 | 227/120 |
| 2007/0045378 | A1 * | 3/2007 | Liu | B25C 5/0228 | 227/155 |
| 2008/0116243 | A1 * | 5/2008 | Huang | B25C 5/161 | 227/132 |
| 2009/0072003 | A1 * | 3/2009 | Matsukawa | B25C 5/0242 | 227/120 |
| 2009/0114698 | A1 * | 5/2009 | Marks | B25C 5/11 | 227/139 |
| 2011/0233256 | A1 * | 9/2011 | Marks | B25C 5/0292 | 227/139 |
| 2018/0319036 | A1 * | 11/2018 | Duan | B25C 5/16 | |
| 2023/0330824 | A1 * | 10/2023 | Jin | B25C 5/15 | |

FOREIGN PATENT DOCUMENTS

| | | | |
|---|---|---|---|
| CN | 206230462 | U | 6/2017 |
| CN | 112123283 | A | 12/2020 |
| CN | 112192514 | A | 1/2021 |

* cited by examiner

STUCK STAPLE PROCESSING MECHANISM OF ELECTRIC STAPLER AND ELECTRIC STAPLER

CROSS-REFERENCE TO RELATED APPLICATION

The application claims priority to Chinese patent application No. 202010858297.0, filed to the China National Intellectual Property Administration on Aug. 24, 2020 and entitled "Stuck Staple Processing Mechanism of Electric Stapler and Electric Stapler".

TECHNICAL FIELD

The disclosure relates to an electric stapler, and in particular to a stuck staple processing mechanism of the electric stapler.

BACKGROUND

An existing electric stapler, such as an electronically controlled stapler disclosed in the Chinese patent CN2369864Y, includes a machine base, a motor, a gear speed change mechanism, an eccentric wheel device, a lever mechanism, a blade assembly, a staple channel assembly and a controller, which is equipped with a micro-switch at a paper feeding position of the machine base, the micro-switch drives the motor to rotate through the control of the controller, the motor is connected with the gear speed change mechanism, the gear speed change mechanism drives the eccentric wheel device, and the eccentric wheel device drives the blade assembly to move up and down, so as to press out staples in the staple channel assembly. During binding, documents to be bound touch the micro-switch once, and the motor rotates once to complete one staple placing process. In other words, the electric stapler known to inventors generally includes a machine base, a driver (a motor), a transmission mechanism (a gear speed change mechanism, an eccentric wheel device and a lever mechanism), a blade assembly, a pop-up staple channel assembly and a controller. The motor is controlled to start through the controller, a rotation direction of the motor is changed into the up and down movement of the blade assembly through the transmission mechanism, and then, a staple in the staple channel assembly is pressed out by the blade assembly to complete binding. When staples need to be placed, the pop-up staple channel assembly is operated to pop up an inner staple channel, so as to facilitate the installation of staples.

Because the electric stapler is easy to get stuck, when users remove stuck staples themselves, a staple channel is difficult to pull out due to jamming. If the staple channel is forcibly pulled out, it is easy to deform an upper blade and even completely destroy a binding mechanism, and the electric stapler may not be used. Therefore, this needs to be improved.

SUMMARY

The technical problem to be solved by some embodiments of the disclosure is to overcome the above shortcomings of an art known to inventors and provide a stuck staple processing mechanism of an electric stapler, which is able to conveniently solve the staple sticking problem.

Some embodiments of the disclosure further provide an electric stapler, which may conveniently solve the staple sticking problem.

In some embodiments, a stuck staple processing mechanism of an electric stapler includes a driving mechanism, a transmission mechanism, a pop-up staple channel assembly, a controller and a pop-up mechanism. The transmission mechanism is connected with a pop-up switch of the pop-up staple channel assembly through the pop-up mechanism. When the controller controls the driving mechanism to rotate in a staple placing direction, the pop-up mechanism does not make the staple channel assembly act. When the controller controls the driving mechanism to rotate in an opposite direction of staple placing, the transmission mechanism makes the pop-up switch act through the pop-up mechanism to pop up a staple channel of the staple channel assembly, so as to facilitate a removal of stuck staples.

In some embodiments, the pop-up mechanism includes a side wheel, a lever and a pressing pin, the pop-up switch includes a key lock assembly, the side wheel is fixed on the transmission mechanism and rotates with the transmission mechanism, a middle part of the lever is rotatably fixed on the machine base, an end of the lever is driven by the side wheel, the other end of the lever is unidirectionally transmitted with the pressing pin, and the pressing pin is guided by the machine base and arranged on the key lock assembly of the staple channel assembly. When the side wheel rotates in the staple placing direction, one end of the lever is driven to be downward and the other end is driven to be upward away from the pressing pin. When the side wheel rotates in the opposite direction of staple placing, one end of the lever is driven to be upward and the other end is driven to press the pressing pin, and the pressing pin is downward to unlock the key lock assembly of the staple channel assembly and pop up the staple channel of the staple channel assembly.

In some embodiments, the pop-up mechanism includes a side wheel, a lever and a pressing pin. The side wheel is fixed on a transmission gear of the transmission mechanism, the middle part of the lever is rotatably fixed on the machine base, an end of the lever is driven by the side wheel, the other end of the lever is connected with the pressing pin, and the pressing pin is guided by guide grooves in two sides of the machine base and arranged on the key lock assembly of the staple channel assembly. When the side wheel rotates in the staple placing direction, an end of the lever is driven to be downward and the other end is driven to be upward away from the pressing pin. When the side wheel rotates in the opposite direction of staple placing, an end of the lever is driven to be upward and the other end is driven to press the pressing pin, and the pressing pin is downward to unlock the key lock assembly of the staple channel assembly and pop up a staple channel of the staple channel assembly.

In some embodiments, a section of cam is arranged on a circumference of the side wheel. When the side wheel rotates in the staple placing direction, the cam drives the end of the lever to be downward and the other end to be downward away from the pressing pin. When the side wheel rotates in the opposite direction of staple placing, the cam drives the end of the lever to be upward and the other end to press the pressing pin, and the pressing pin is downward to unlock the key lock assembly of the staple channel assembly and pop up the staple channel of the staple channel assembly.

In some embodiments, a disc is arranged on an outer side of the cam, and an end of the lever is limited by the disc, which prevents the lever from being separated from the cam.

In some embodiments, a restoring mechanism is arranged between the lever and the machine base. When the lever loses external force, the restoring mechanism enables the lever to return to an original position.

In some embodiments, the restoring mechanism includes a tension spring, an end of the tension spring is connected with the machine base, and the other end of the tension spring is connected with an end of the lever, so that the lever far away is able to be reset when the lever loses driving force.

In some embodiments, the pop-up staple channel assembly includes an inner staple channel, an outer staple channel, a long pin push, a staple pusher, a staple pusher spring and a key lock assembly. The inner staple channel is placed in the outer staple channel and may slide in the outer staple channel. A tail of the inner staple channel is provided with a hook groove. An end of the long pin push is fixed at the tail of the outer staple channel, and the other end is fixed at a front of the outer staple channel. The staple pusher spring is sleeved on the long pin push, one end is limited by the tail of the outer staple channel, the other end is fixed on the staple pusher, the staple pusher is placed in the inner staple channel and may slide in the inner staple channel, and staples are placed between a head of the inner staple channel and a front end of the staple pusher, so that the staple placing of the staple channel assembly is consistent with the stuck staple processing mechanism. The key lock assembly includes a button, a button lock spring and a fixing pin, one end of the button is provided with a pressing part, the other end is provided with a hook part, a tail of the staple channel in the staple channel assembly is provided with a hook groove corresponding to the hook part, the hook part hooks the hook groove in a normal state, an end of the button lock spring is limited by an inner side of the button, and the other end is limited by a tail end of the staple channel.

Some embodiments of the disclosure further provide an electric stapler, which includes the above stuck staple processing mechanism.

Compared with the art known to inventors, some embodiments of the disclosure have the following advantages: because the pop-up mechanism is arranged on the existing electric stapler, when a staple is stuck, it may use the mechanism of the existing electric stapler to reversely start through the driving mechanism and pop up the staple channel in the staple channel assembly through the pop-up mechanism, so that the staple stuck in the staple channel assembly is taken out smoothly, and thus, the staple sticking problem is conveniently solved.

Figure 1:
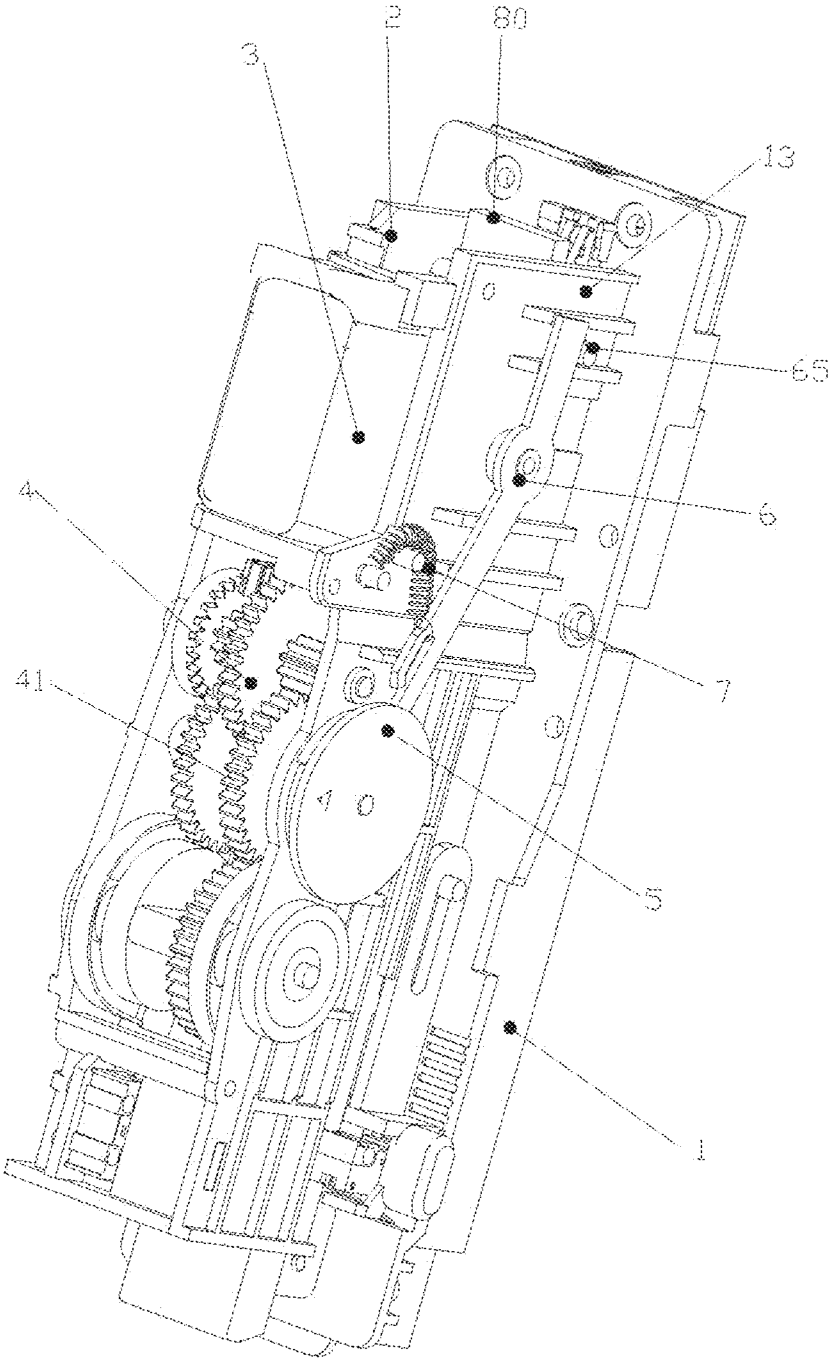
FIG. 1 is a three-dimensional diagram of an electric stapler according to an embodiment of the disclosure.
Figure 2:
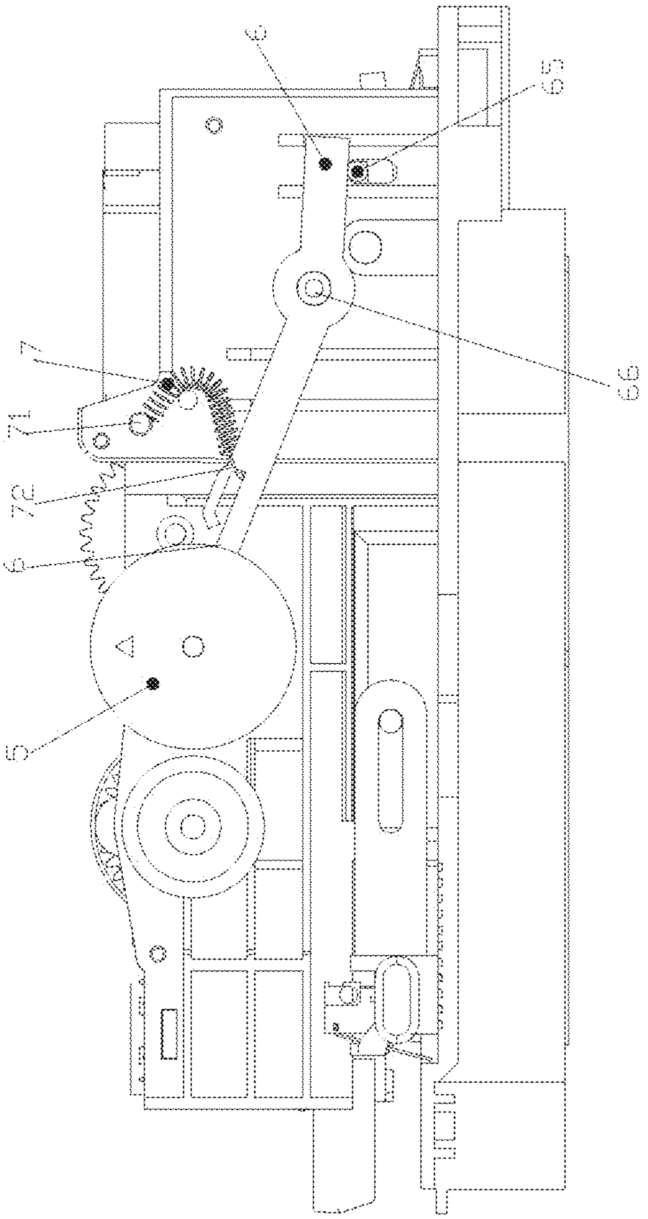
FIG. 2 is a main view of an electric stapler according to an embodiment of the disclosure.
Figure 3:
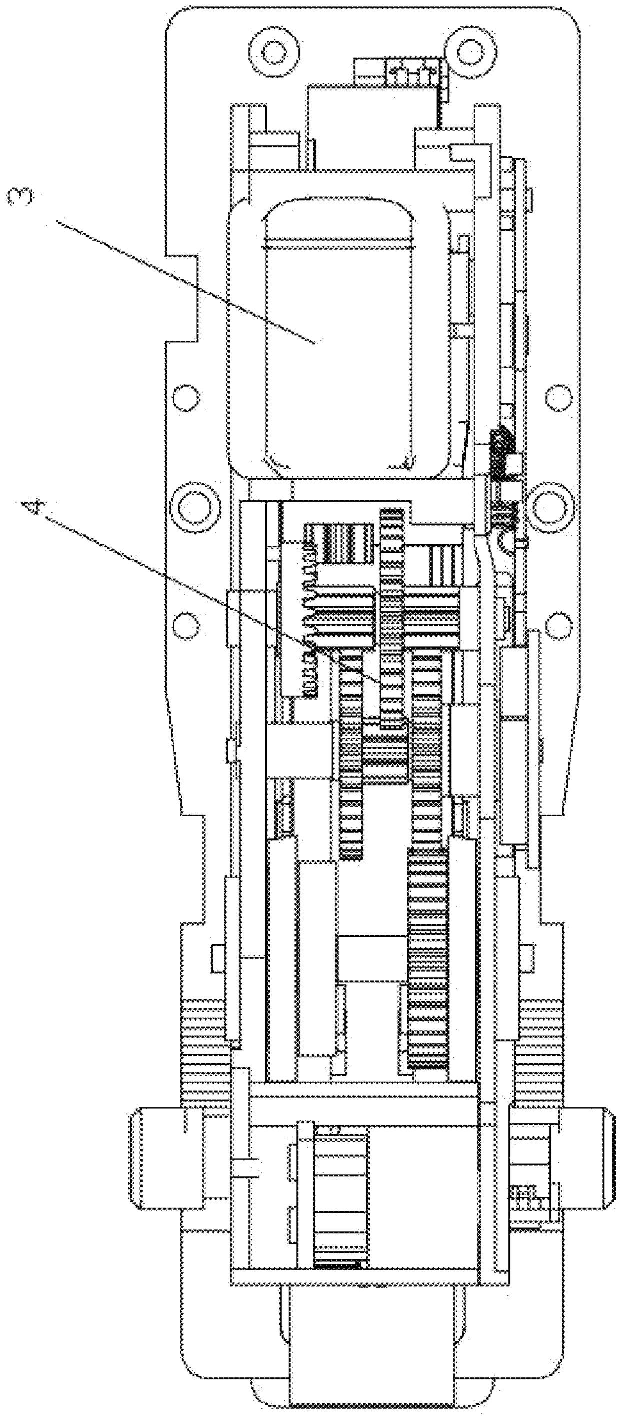
FIG. 3 is a top view of an electric stapler according to an embodiment of the disclosure.

1: Base; 13: Support; 2: Machine base; 21: Guide groove; 3: Motor; 4: Transmission mechanism; 41: Transmission gear; 411: Connecting groove; 5: Side wheel; 51: Cam; 52: Side wheel central shaft; 521: Pushing part; 53: Disc; 6: Lever; 61: Front end; 62: Rear end; 63: Slit branch; 65: Pressing pin; 66: Pin; 7: Tension spring; 71: One end of tension spring; 72: The other end of tension spring; 74: Column; 8: Staple channel assembly; 80: Key lock assembly; 81: Internal staple channel; 811: Hook groove; 816: staple channel handle; 82: External staple channel; 821: Tail end of staple channel; 83: Long pin push; 84: Staple pusher; 85: Staple pusher spring; 86: Button; 861: Pressing part; 862: Hook part; 87: Button lock spring; 88: Fixing pin; 9: Blade assembly.

DETAILED DESCRIPTION OF THE EMBODIMENTS

The disclosure is further described below in combination with the drawings and embodiments.

For the convenience of narration, the position words used below, such as front, rear, clockwise and anticlockwise, are described according to the existing drawings, which do not limit the scope of protection of the disclosure, but may still change accordingly according to different visual directions of the drawings.

As shown in FIG. 1 to FIG. 12, an electric stapler includes a machine base 2, a motor 3, a transmission mechanism 4, a pop-up mechanism, a staple channel assembly 8, a blade assembly 9 and a controller (not shown in the figure).

The main improvement of the disclosure lies in: a stuck staple processing mechanism of an electric stapler, wherein the stuck staple processing mechanism includes a driving mechanism, a transmission mechanism 4, a pop-up staple channel assembly 8, a controller and a pop-up mechanism.

The motor 3, the transmission mechanism 4, the pop-up mechanism, the staple channel assembly 8, the blade assembly 9 and the controller are all fixed on the machine base 2.

In some embodiments of the disclosure, the pop-up mechanism includes a side wheel 5, a lever 6 and a pressing pin 65.

In some embodiments of the disclosure, a section of cam 51 is arranged on a circumference of the side wheel 5, with a fixed part in a middle, which is fixed on the transmission mechanism through the fixed part. In the embodiment, the transmission mechanism 4 includes a set of gears, in which a centre of one transmission gear 41 is provided with a connecting groove 411, which is cooperated with a side wheel central shaft 52, and the side wheel central shaft 52 is inserted into the connecting groove 411 to combine the transmission gear 41 and the side wheel 5 together. In this way, it may be driven by the transmission mechanism to rotate forward and backward synchronously.

In some embodiments of the disclosure, a middle part of the lever 6 is rotatably fixed on the machine base 2 through a pin 66, a front end 61 of the lever 6 is driven by a driving cam 51 of the side wheel 5, and a rear end 62 of the lever 6 is connected above the pressing pin 65.

In some embodiments of the disclosure, the pressing pin 65 is guided by guide grooves 21 in two sides of the machine base and arranged on a key lock assembly 80 of the staple channel assembly.

When the controller controls the driving mechanism to rotate in the staple placing direction, the side wheel 5 rotates in the staple placing direction, the front end 61 of the lever 6 is driven to be downward and the rear end 62 is driven to be upward away from the pressing pin 65, and the whole pop-up mechanism does not make the key lock assembly 80 act and thus does not make the whole staple channel assembly 8 act. When the controller controls the driving mechanism to rotate in the opposite direction of staple placing, the side wheel 5 rotates in the opposite direction of staple placing, the front end 61 of the lever 6 is driven to be upward and the rear end 62 is driven to be downward to press the pressing pin 65, and the pressing pin 65 is downward to unlock the key lock assembly 80 of the staple channel assembly 8 and pop up a staple channel.

In some embodiments of the disclosure, a disc 53 is also arranged on an outer side of the cam 51, and the front end 61 of the lever 6 is limited by the disc 53, which prevents the lever 6 from being separated from the cam 51.

In some embodiments, a tension spring 7 is also arranged, one end 71 of the tension spring is connected with the machine base 2, and the other end 72 of the tension spring is connected with the front end 61 of the lever 6, so that the front end 61 of the lever 6 far away is reset when the lever 6 loses the driving force. The front end 61 of the lever 6 in the embodiment is in the shape of a tree fork, and the other end 72 of the tension spring is connected to a fork branch 63, which is convenient for connection.

In some embodiments, the machine base 2 is provided with a column 74 corresponding to a middle position of the tension spring 7, so that, when the tension spring 7 rises by the front end 61 of the lever 6, it may move with the column 74 as a fulcrum without causing the tension spring 7 to bounce.

As shown in FIG. 10 to FIG. 14, in some embodiments, the staple channel assembly 8 includes an inner staple channel 81, an outer staple channel 82, a long pin push 83, a staple pusher 84, a staple pusher spring 85 and a key lock assembly 80. The inner staple channel 81 is placed in the outer staple channel and is slidable in the outer staple channel. A hook groove 811 is arranged at a tail of the inner staple channel 81. An end of the long pin push 83 is fixed at the tail of the outer staple channel, and the other end is fixed at the front of the outer staple channel. The staple pusher spring 85 is sleeved on the long pin push 83, an end of the staple pusher spring 85 is limited by the tail of the outer staple channel 82, the other end is fixed on the staple pusher 84, the staple pusher 84 is placed in the inner staple channel and is able to slide in the inner staple channel, and a staple is placed between a head of the inner staple channel and the front end of the staple pusher 84.

The staple channel assembly 8 is fixed on the base 1 of the machine base through the outer staple channel 82, and cooperates with a blade assembly. A staple installed in the inner staple channel 81 is pushed out and bound by a blade in the blade assembly.

The other end of the inner staple channel 81 is also provided with a staple channel handle 816, and the inner staple channel 81 may be moved through the staple channel handle 816.

In some embodiments, the key lock assembly 80 includes a button 86, a button lock spring 87 and a fixing pin 88. One end of the button 86 is provided with a pressing part 861, and the other end of the button 86 is provided with a hook part 862. The hook part 862 hooks a tail hook groove 811 of the inner staple channel 81 in a normal state. One end of the button lock spring 87 is limited by an inner side of the button 86, and the other end is limited by a tail end 821 of a staple channel.

In some embodiments, the pressing part 861 of the button 86 is provided with a pressing pin 65. When the pressing part 861 is subjected to downward force of the pressing pin 65, the button 86 rotates outward against the spring force, so that the button hook part 862 is separated from the tail hook groove 811 of the inner staple channel 81.

Figure 9:
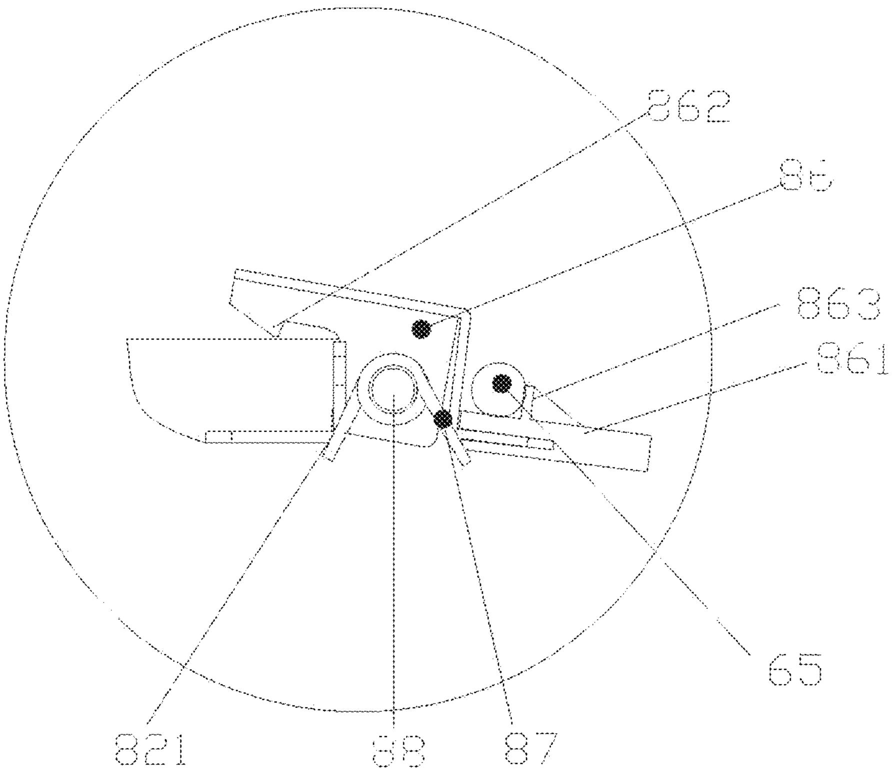
FIG. 9 is an enlarged diagram of a part A in FIG. 8.
Figure 10:
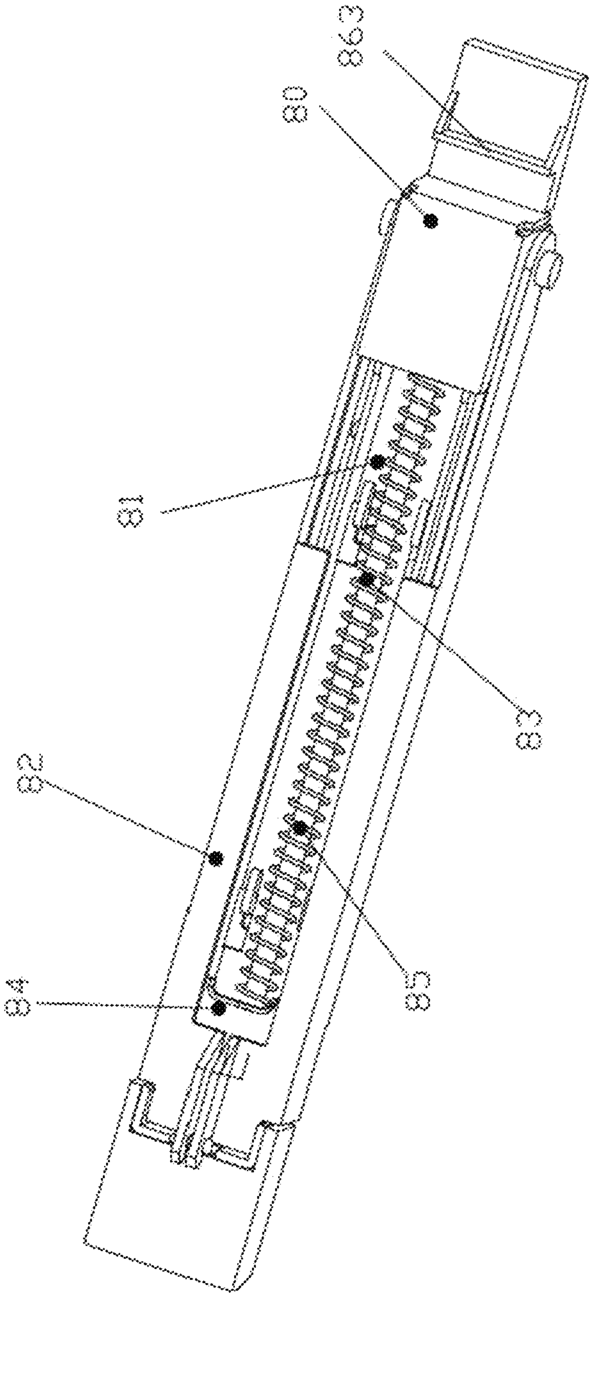
FIG. 10 is a three-dimensional diagram of a pop-up staple channel assembly of an electric stapler according to an embodiment of the disclosure.
Figure 11:
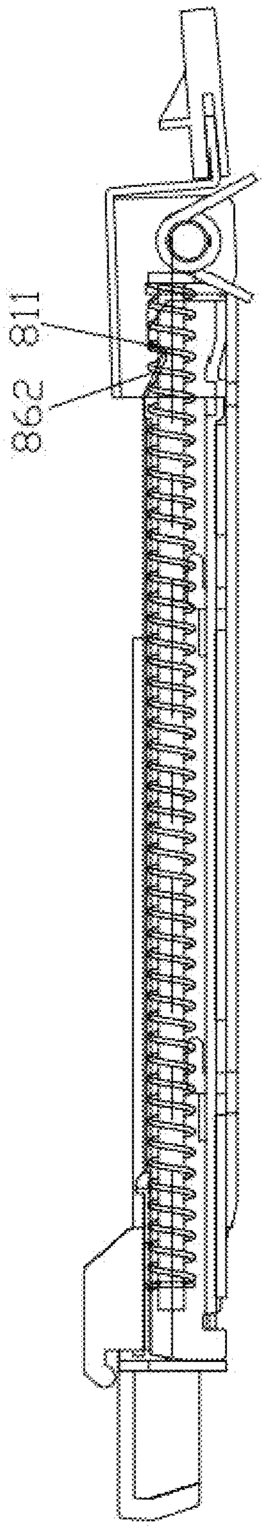
FIG. 11 is a schematic structural diagram when a pop-up staple channel assembly of an electric stapler is in a normal state according to an embodiment of the disclosure.
Figure 12:
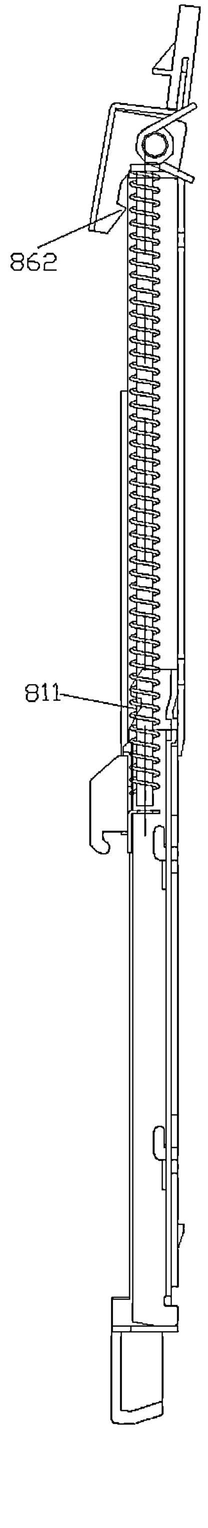
FIG. 12 is a schematic structural diagram when a pop-up staple channel assembly of an electric stapler is popped up according to an embodiment of the disclosure.
Figure 13:
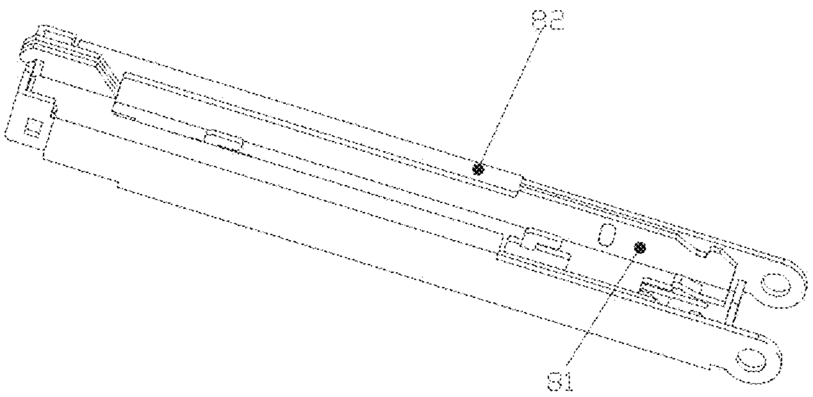
FIG. 13 is a schematic structural diagram of a staple channel assembly of an electric stapler in FIG. 1 of the disclosure.
Figure 14:
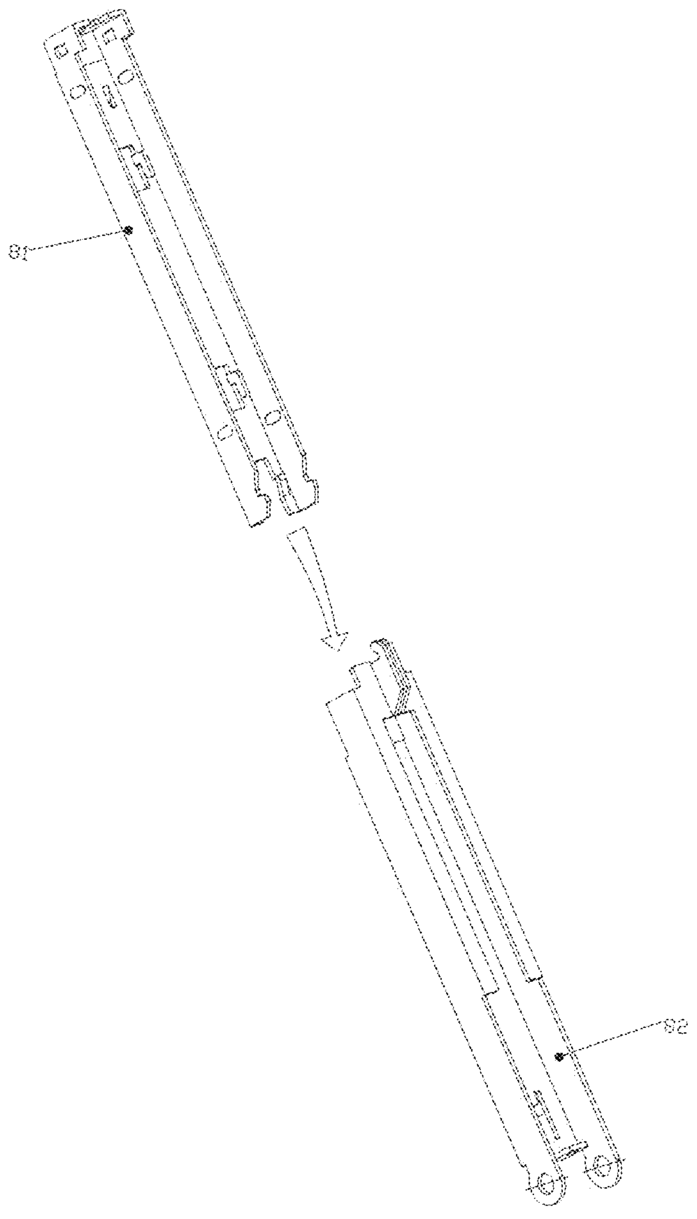
FIG. 14 is a decomposition diagram of a staple channel assembly in FIG. 13.

As shown in FIG. 9 and FIG. 10, in some embodiments, a stop part 863 connected with the pressing part 861 is also included. By setting the stop part 863, the pressing pin 65 is limited on the pressing part 861, so as to prevent the pressing pin 65 from being separated from the pressing part 861 during movement. In this way, the pressing pin 65 is able to drive the pressing part 861 to move.

The blade assembly is a commonly used electric stapler mechanism, which has nothing to do with the technical problem to be solved by some embodiments of the disclosure, referring to its common structures or the structure disclosed by CN2369864Y, which will not be elaborated here.

The pop-up mechanism includes a cam 51 and a lever 6. The cam 51 is rotatably fixed on a circumference of the side wheel 5 through screws. The lever 6 is arranged below the cam 51, movably connected to the base 1, and is able to move back and forth on the base 1.

Figure 4:
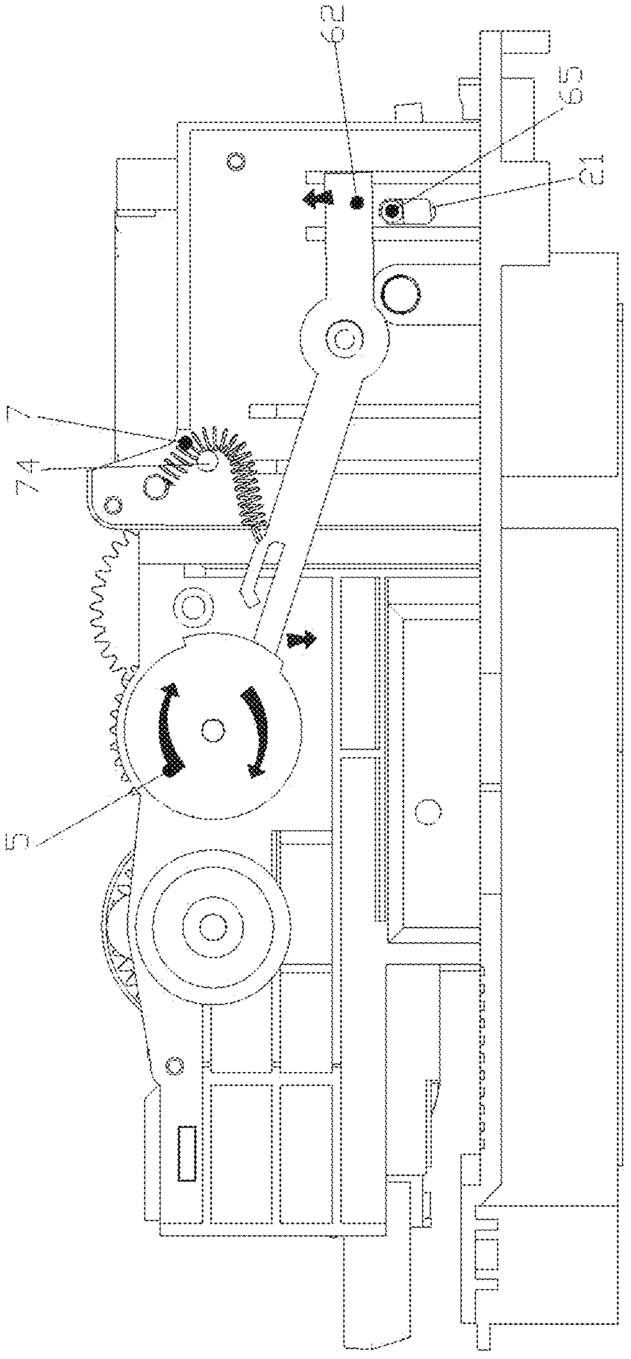
FIG. 4 is a schematic structural diagram that a stuck staple processing mechanism is matched during normal binding according to an embodiment of the disclosure.
Figure 5:
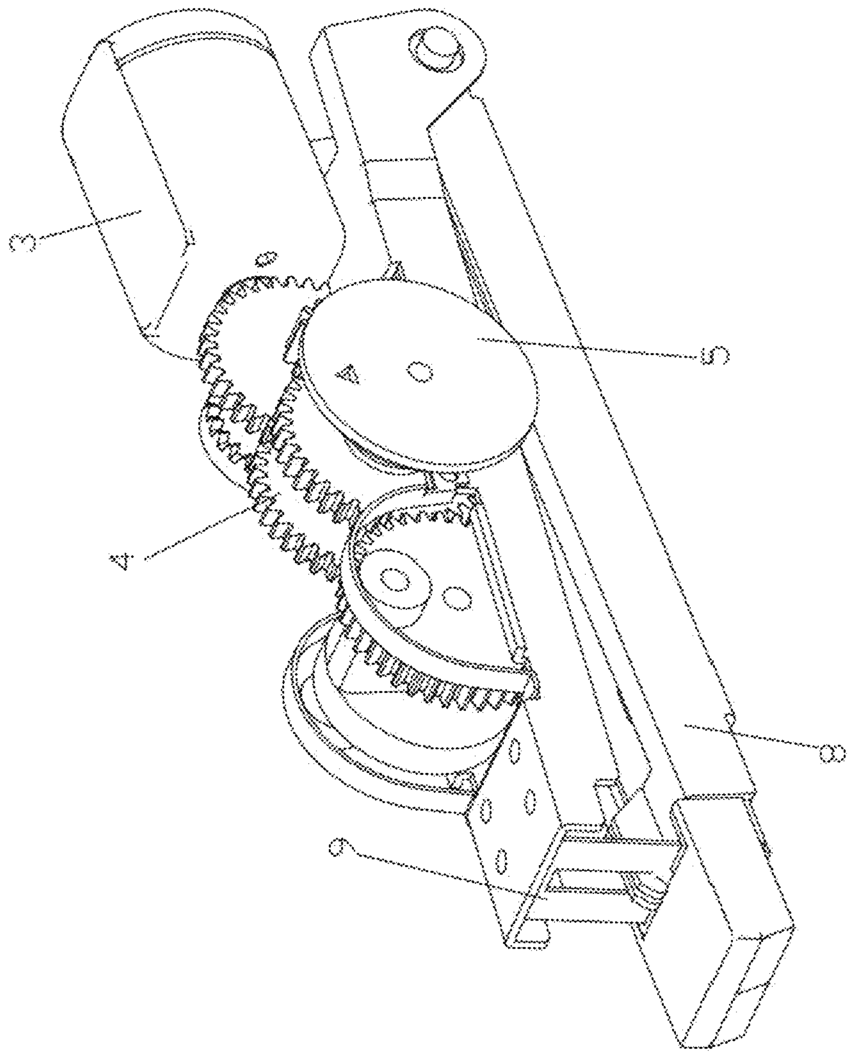
FIG. 5 is a schematic structural diagram of a motor, a transmission mechanism, a staple channel assembly and a blade assembly of an electric stapler according to an embodiment of the disclosure.
Figure 6:
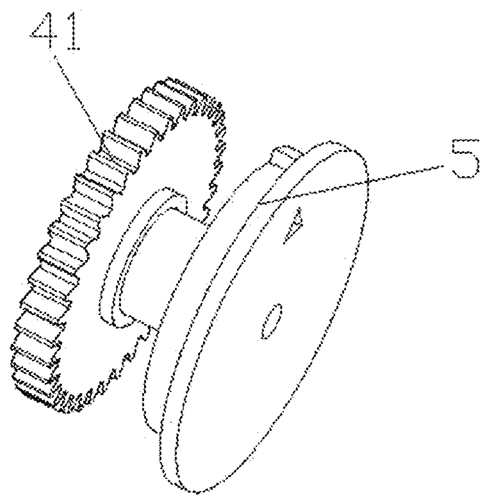
FIG. 6 is a three-dimensional diagram that a transmission gear is combined with a side wheel according to an embodiment of the disclosure.
Figure 7:
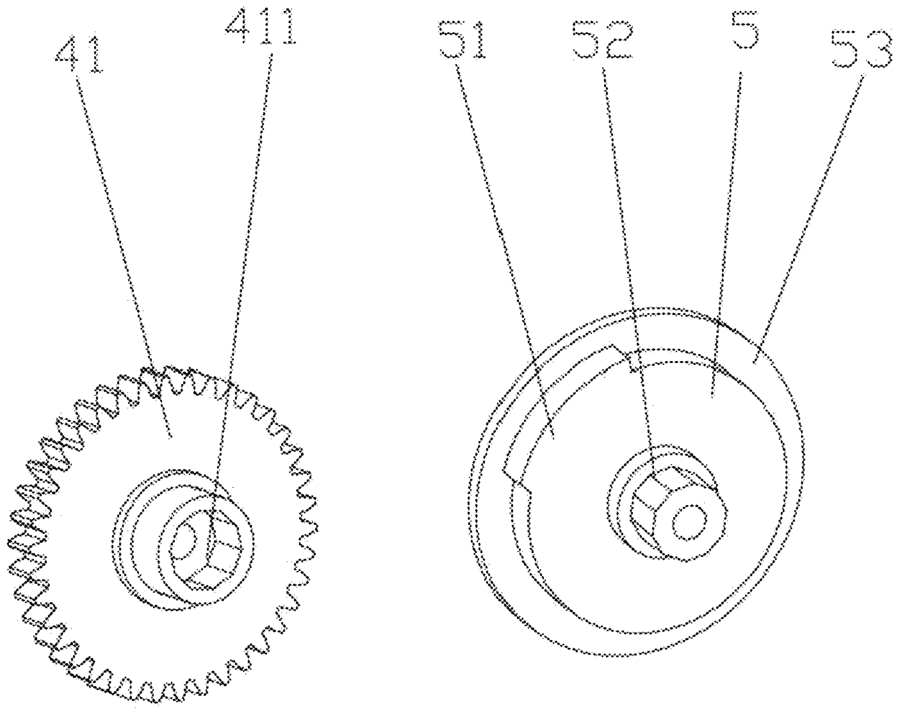
FIG. 7 is a decomposition schematic diagram of a transmission gear and a side wheel according to an embodiment of the disclosure.

As shown in FIG. 4, in some embodiments of the present disclosure, a pushing part 521 is arranged at the rear of the lever 6, and the pushing part 521 is matched with an end of the button 86 of the key lock assembly 80. When the lever 6 rotates clockwise, the pressing pin 65 rotates the button 86 clockwise, so as to separate the hook part 862 from the tail hook groove 811 of the inner staple channel 81.

In some embodiments, a restoring mechanism is also arranged between the lever 6 and the base 1. In the embodiments, the restoring mechanism is as follows: a restoring spring, a front end of the restoring spring is limited by the end of the lever 6, a rear end of the restoring spring is limited by a support 13 on the base 1, the lever 6 is also provided with a guide groove 21, the pressing pin 65 is inserted into the guide groove 21, and the pressing pin 65 is fixed on the base 1 (not shown in the figure). In this way, when the lever 6 is moved to the right by a force of the cam 51, the restoring spring is guided and compressed by the pressing pin 65. When the lever 6 loses the external force of the cam 51, the lever 6 is reset by the restoring force of the restoring spring.

When the electric stapler is filled with staples normally, its action is similar to that of the electric stapler disclosed in the Chinese patent literature CN2369864Y, and the description of the above literature may also be referred to. Some new action processes of some embodiments of the disclosure are as follows: during binding, the controller starts the motor to rotate forward and drives the transmission mechanism to rotate, and the side wheel 5 rotates clockwise. When the cam 51 on the side wheel's circumference rotates to touch the lever 6 and drive the lever 6 to rotate, the front end 61 of the lever 6 is downward, and the rear end 62 is raised and does not contact the pressing pin 65. In this way, stapling may be implemented normally, as shown in FIG. 4.

Figure 8:
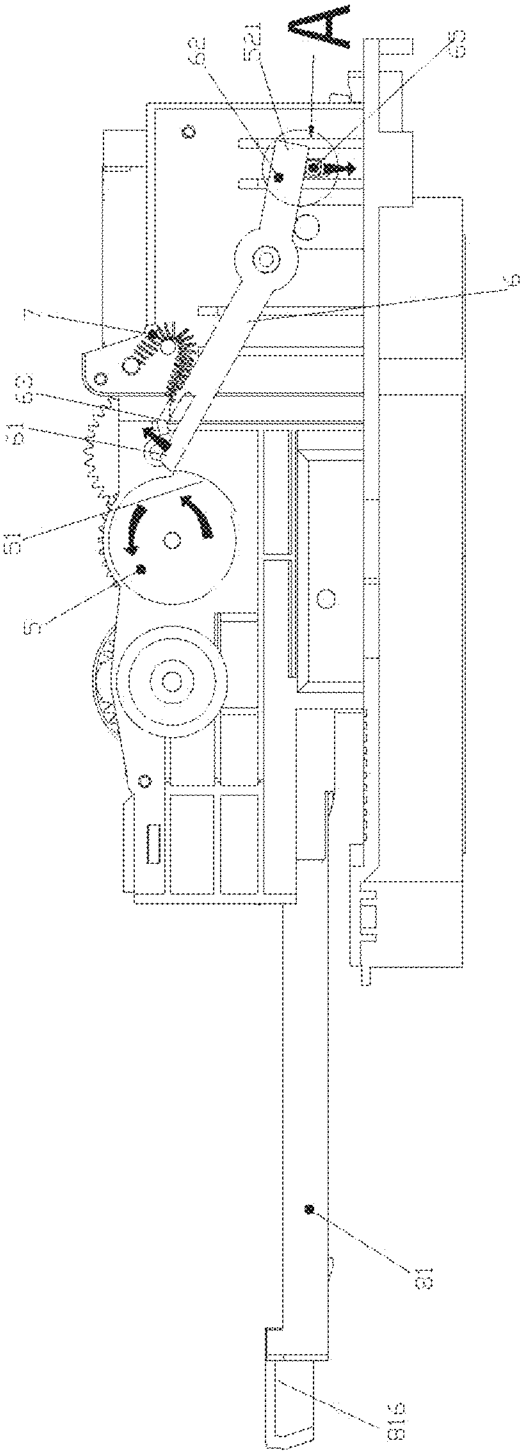
FIG. 8 is a schematic structural diagram that a stuck staple processing mechanism is matched during staple sticking according to an embodiment of the disclosure.

When the electric stapler is stuck and needs to deal with a stuck staple, the controller starts the motor to reverse and drive the transmission mechanism to rotate. The side wheel 5 rotates anticlockwise. When the cam 51 on the side wheel's circumference rotates to touch the front end 61 of the lever 6 and drive the lever 6 to rotate upward, the front end 61 of the lever 6 lifts upward, the rear end 62 presses down the pressing pin 65, the pressing pin 65 drives the key lock assembly 80 to be downward, and an end of the button 86 is rotated upward to separate the end hook part 862 from the tail hook groove 811 of the inner staple channel 81, so that the inner staple channel 81 pops up under the action of the staple pusher spring 85. Therefore, it is convenient to remove the staple stuck in a binding machine, as shown in FIG. 8.

The above are some embodiments of the disclosure and not intended to limit the disclosure, and for those skilled in the art, the disclosure may have various modifications and variations. Any modification, equivalent replacement, improvement and the like within the spirit and principle of the disclosure shall fall within the scope of protection of the disclosure.

What is claimed is:

1. A stuck staple processing mechanism of an electric stapler, comprising:

a driving mechanism;

a transmission mechanism;

a pop-up staple channel assembly;

a controller; and a pop-up mechanism, wherein the transmission mechanism is connected with a pop-up switch of the pop-up staple channel assembly through the pop-up mechanism; when the controller controls the driving mechanism to rotate in a staple placing direction, the pop-up mechanism does not make the staple channel assembly act; when the controller controls the driving mechanism to rotate in an opposite direction of staple placing, the transmission mechanism makes the pop-up switch act through the pop-up mechanism to pop up a staple channel of the staple channel assembly, so as to facilitate a removal of a stuck staple;

wherein the pop-up mechanism comprises a side wheel, a lever and a pressing pin, the pop-up switch comprises a key lock assembly, the side wheel is fixed on the transmission mechanism and rotates with the transmission mechanism, a middle part of the lever is rotatably fixed on a machine base, one end of the lever is driven by the side wheel, an other end of the lever is unidirectionally transmitted with the pressing pin, the pressing pin is guided by the machine base and arranged on the key lock assembly of the staple channel assembly, when the side wheel rotates in the staple placing direction, the one end of the lever is driven to be downward and the other end is driven to be upward away from the pressing pin; when the side wheel rotates in the opposite direction of staple placing, the one end of the lever is driven to be upward and the other end is driven to press the pressing pin, and the pressing pin is downward to unlock the key lock assembly of the staple channel assembly and pop up the staple channel of the staple channel assembly.

2. The stuck staple processing mechanism of the electric stapler as claimed in claim 1, wherein the pop-up mechanism comprises the side wheel, the lever and the pressing pin, the side wheel is fixed on a transmission gear of the transmission mechanism, a middle part of the lever is rotatably fixed on a machine base, the one end of the lever is driven by the side wheel, the other end of the lever is connected with the pressing pin, the pressing pin is guided by guide grooves in two sides of the machine base and arranged on a key lock assembly of the staple channel assembly, when the side wheel rotates in the staple placing direction, the one end of the lever is driven to be downward and the other end of the lever is driven to be upward away from the pressing pin; when the side wheel rotates in the opposite direction of staple placing, the one end of the lever is driven to be upward and the other end of the lever is driven to press the pressing pin, and the pressing pin is downward to unlock the key lock assembly of the staple channel assembly and pop up the staple channel of the staple channel assembly.

3. The stuck staple processing mechanism of the electric stapler as claimed in claim 2, wherein a section of cam is arranged on a circumference of the side wheel, when the side wheel rotates in the staple placing direction, the cam drives the one end of the lever to be downward and the other end of the lever to be go up away from the pressing pin; when the side wheel rotates in the opposite direction of staple placing, the cam drives the one end of the lever to be upward and the other end of the lever to press the pressing pin, and the pressing pin is downward to unlock the key lock assembly of the staple channel assembly and pop up the staple channel of the staple channel assembly.

4. The stuck staple processing mechanism of the electric stapler as claimed in claim 3, wherein a disc is arranged on an outer side of the cam, and an end of the lever is limited by the disc.

5. The stuck staple processing mechanism of the electric stapler as claimed in claim 1, wherein a restoring mechanism is arranged between the lever and the machine base, and when the lever loses external force, the restoring mechanism enables the lever to return to an original position.

6. The stuck staple processing mechanism of the electric stapler as claimed in claim 5, wherein the restoring mechanism comprises a tension spring, wherein an end of the tension spring is connected with the machine base, and an other end of the tension spring is connected with an end of the lever.

7. The stuck staple processing mechanism of the electric stapler as claimed in claim 1, wherein the pop-up staple channel assembly comprises an inner staple channel, an outer staple channel, a long pin push, a staple pusher, a staple pusher spring and a key lock assembly, wherein the inner staple channel is placed in the outer staple channel and is slidable in the outer staple channel, a hook groove is arranged at a tail of the inner staple channel, an end of the long pin push is fixed at the tail of the outer staple channel, an other end of the long pin push is fixed at a front of the outer staple channel, the staple pusher spring is sleeved on the long pin push, an end of the staple pusher spring is limited by the tail of the outer staple channel, an other end of the staple pusher spring is fixed on the staple pusher, the staple pusher is placed in the inner staple channel and slidable in the inner staple channel, a staple is placed between a head of the inner staple channel and a front end of the staple pusher, so that a staple placing of the staple channel assembly is consistent with a staple placing of the stuck staple processing mechanism;

the key lock assembly comprises a button, a button lock spring and a fixing pin, an end of the button is provided with a pressing part, an other end of the button is provided with a hook part, a tail of the inner staple channel of the staple channel assembly is provided with a hook groove corresponding to the hook part, the hook part hooks the hook groove in a normal state, an end of the button lock spring is limited by an inner side of the button, and an other end of the button lock spring is limited by a tail end of a staple channel.

8. An electric stapler, comprising the stuck staple processing mechanism as claimed in claim 1.

9. The electric stapler as claimed in claim 8, wherein the pop-up mechanism comprises the side wheel, the lever and the pressing pin, the side wheel is fixed on a transmission gear of the transmission mechanism, a middle part of the lever is rotatably fixed on a machine base, the one end of the lever is driven by the side wheel, the other end of the lever is connected with the pressing pin, the pressing pin is guided by guide grooves in two sides of the machine base and arranged on a key lock assembly of the staple channel assembly, when the side wheel rotates in the staple placing direction, the one end of the lever is driven to be downward and the other end of the lever is driven to be upward away from the pressing pin; when the side wheel rotates in the opposite direction of staple placing, one end of the lever is driven to be upward and the other end of the lever is driven to press the pressing pin, and the pressing pin is downward to unlock the key lock assembly of the staple channel assembly and pop up the staple channel of the staple channel assembly.

10. The electric stapler as claimed in claim 9, wherein a section of cam is arranged on a circumference of the side wheel, when the side wheel rotates in the staple placing direction, the cam drives the one end of the lever to be downward and the other end of the lever to be downward away from the pressing pin; when the side wheel rotates in the opposite direction of staple placing, the cam drives the one end of the lever to be upward and the other end of the lever to press the pressing pin, and the pressing pin is downward to unlock the key lock assembly of the staple channel assembly and pop up the staple channel of the staple channel assembly.

11. The electric stapler as claimed in claim 10, wherein a disc is arranged on an outer side of the cam, and an end of the lever is limited by the disc.

12. The electric stapler as claimed in claim 8, wherein a restoring mechanism is arranged between the lever and the machine base, and when the lever loses external force, the restoring mechanism enables the lever to return to an original position.

13. The electric stapler as claimed in claim 12, wherein the restoring mechanism comprises a tension spring, wherein an end of the tension spring is connected with the machine base, and an other end of the tension spring is connected with an end of the lever.

14. The electric stapler as claimed in claim 8, wherein the pop-up staple channel assembly comprises an inner staple channel, an outer staple channel, a long pin push, a staple pusher, a staple pusher spring and a key lock assembly, wherein the inner staple channel is placed in the outer staple channel and is slidable in the outer staple channel, a hook groove is arranged at a tail of the inner staple channel, an end of the long pin push is fixed at the tail of the outer staple channel, an other end of the long pin push is fixed at a front of the outer staple channel, the staple pusher spring is sleeved on the long pin push, an end of the staple pusher spring is limited by the tail of the outer staple channel, an other end of the staple pusher spring is fixed on the staple pusher, the staple pusher is placed in the inner staple channel and slidable in the inner staple channel, a staple is placed between a head of the inner staple channel and a front end of the staple pusher, so that a staple placing of the staple channel assembly is consistent with a staple placing of the stuck staple processing mechanism;

the key lock assembly comprises a button, a button lock spring and a fixing pin, an end of the button is provided with a pressing part, an other end of the button is provided with a hook part, a tail of the inner staple channel of the staple channel assembly is provided with a hook groove corresponding to the hook part, the hook part hooks the hook groove in a normal state, an end of the button lock spring is limited by an inner side of the button, and an other end of the button lock spring is limited by a tail end of a staple channel.

* * * * *